US009925990B2

(12) United States Patent
Nicolau et al.

(10) Patent No.: US 9,925,990 B2
(45) Date of Patent: Mar. 27, 2018

(54) COOLING AERAULICS DEVICE FOR A RAIL VEHICLE ELEMENT AND CORRESPONDING RAIL VEHICLE

(71) Applicant: ALSTOM TRANSPORT TECHNOLOGIES, Levallois-Perret (FR)

(72) Inventors: Sébastien Nicolau, Loubajac (FR); Denis Cornu, Odomez (FR)

(73) Assignee: Alstom Transport Technologies, Levallois-Perret (FR)

(*) Notice: Subject to any disclaimer, the term of this patent is extended or adjusted under 35 U.S.C. 154(b) by 140 days.

(21) Appl. No.: 14/958,745

(22) Filed: Dec. 3, 2015

(65) Prior Publication Data
US 2016/0159373 A1  Jun. 9, 2016

(30) Foreign Application Priority Data
Dec. 3, 2014  (FR) ...................................... 14 61884

(51) Int. Cl.
B61D 27/00    (2006.01)
B60H 1/00     (2006.01)
(Continued)

(52) U.S. Cl.
CPC ..... B61D 27/0072 (2013.01); B60H 1/00271 (2013.01); B60H 1/00328 (2013.01);
(Continued)

(58) Field of Classification Search
CPC ............ B61D 27/0072; B60H 1/00271; B60H 1/00328; B60H 1/00385; B60H 1/18;
(Continued)

(56) References Cited
U.S. PATENT DOCUMENTS 2,235,205 A    3/1941  Dean
3,862,549 A *  1/1975  Fernandes .......... B60H 1/00371
                                                       165/42
(Continued)

FOREIGN PATENT DOCUMENTS

DE    102012216746 B3    9/2013
EP        0578549 A1    1/1994
(Continued)

OTHER PUBLICATIONS

Search Report dated Jul. 21, 2015 in FR priority application No. 1461884.

Primary Examiner — Mohammad M Ali
(74) Attorney, Agent, or Firm — Knobbe, Martens, Olson & Bear, LLP

(57) ABSTRACT

A cooling aeraulics device is for cooling an element of a rail vehicle. The aeraulics device is designed to be placed on a roof of the rail vehicle and includes a conduit, which extends substantially longitudinally in relation to the rail vehicle. The conduit includes, successively, a front portion equipped with a front opening for the intake of air, a central portion, in which is housed the element to be cooled, and a rear portion, equipped with a rear opening for the discharge of exhaust air. A surface of a transverse cross-section of the conduit evolves, from the front opening to the rear opening, so as to generate an acceleration of the flow of air in the conduit through the Venturi effect.

9 Claims, 3 Drawing Sheets

(51) Int. Cl.
*B61C 5/02* (2006.01)
*B61C 17/04* (2006.01)

(52) U.S. Cl.
CPC .......... *B60H 1/00385* (2013.01); *B61C 5/02* (2013.01); *B61C 17/04* (2013.01); *Y02T 30/10* (2013.01)

(58) Field of Classification Search
CPC . B61C 5/02; B61C 17/04; Y02T 30/10; Y02T 10/16; Y02T 10/144; F28F 27/02; F28F 9/0265; F28F 9/028; F28F 1/40; F28F 2009/224; F28F 2250/06; F28F 21/0003; F28D 7/106
USPC .................................. 62/241, 428; 454/107
See application file for complete search history.

(56) References Cited

U.S. PATENT DOCUMENTS

| | | | | |
|---|---|---|---|---|
| 5,549,205 A | * | 8/1996 | Doche | H01L 21/67393 206/213.1 |
| 8,166,752 B2 | * | 5/2012 | Garcia | F01N 3/05 60/308 |
| 2005/0251299 A1 | * | 11/2005 | Donnelly | B60L 7/08 701/19 |
| 2009/0084364 A1 | * | 4/2009 | Martins | F01P 1/06 123/563 |
| 2009/0138149 A1 | * | 5/2009 | Chattot | B60L 1/003 701/22 |
| 2012/0085117 A1 | * | 4/2012 | Ikemiya | B60H 1/3232 62/277 |
| 2012/0090342 A1 | * | 4/2012 | Ikemiya | B60P 3/20 62/239 |
| 2012/0309284 A1 | * | 12/2012 | Dernis | F24F 11/0001 454/184 |
| 2014/0069541 A1 | * | 3/2014 | Loringer | F01N 13/1811 138/42 |

FOREIGN PATENT DOCUMENTS

| | | |
|---|---|---|
| FR | 509662 A | 11/1920 |
| FR | 1591809 A | 5/1970 |
| WO | 2008/031752 A1 | 3/2008 |

\* cited by examiner

COOLING AERAULICS DEVICE FOR A RAIL VEHICLE ELEMENT AND CORRESPONDING RAIL VEHICLE

CROSS-REFERENCE TO RELATED APPLICATIONS

This application claims priority to French Patent Application No. 14 61884 filed on Dec. 3, 2014, the disclosure of which including the specification, the drawings, and the claims is hereby incorporated by reference in its entirety.

FIELD OF THE INVENTION

The present invention relates to a cooling aeraulics device for cooling a rail vehicle element, designed to be placed on a roof of the said rail vehicle, of the type comprising a conduit, which extends substantially longitudinally in relation to the rail vehicle and which includes successively a front portion, equipped with a front opening for the intake of air, a central portion, in which is housed the said element to be cooled, and a rear portion, equipped with a rear opening for the discharge of exhaust air.

The invention relates more particularly to a cooling aeraulics device for cooling tubes for circulation of a heat transfer fluid from a condenser of a cooling device, in particular a cooling device for cooling of electronic power components to supply power to the traction motors of the vehicle.

BACKGROUND OF THE INVENTION

In order to ensure the proper operation of such a condenser with a good performance, it is necessary to generate a flow of air around the tubes, in a manner so as to facilitate the exchange of heat between the tubes and the air that surrounds them.

The document EP 0 578 549 describes a cooling aeraulics device comprising an air circulation conduit within the interior of which is housed an element to be cooled, in this case a braking rheostat. The conduit has front and rear portions, which form mobile scoops that can be deployed above the roof cowling of the rail vehicle, in order to divert a fraction of the air flowing along the vehicle in motion, so as to cause it to circulate around the element to be cooled.

However, such a cooling aeraulics device does not provide full satisfaction. The airflow passing through the conduit is vulnerable to mechanical failure of the actuating cylinders for actuating the front and rear portions. Thus, the solution with mobile scoops is not practical.

In addition, such a cooling aeraulics device is sensitive to the speed of the vehicle. At low speed, the flow of air brought over the element to be cooled is insufficient. At high speed, the boundary layer of air flow around the rail vehicle has the tendency to get separated and to move away from the external walls of the vehicle and move beyond the front and rear scoops. Due to thus, the flow of air captured by the device is insufficient to ensure effective cooling.

The document WO 2008/031752 discloses an aeraulic device comprising a conduit of which the profile, between a front opening for the intake of air and a rear opening for the discharge of exhaust air, evolves in a manner so as to generate an acceleration of the flow of air in the conduit by means of the Venturi effect.

SUMMARY OF THE INVENTION

The goal of the invention is therefore to overcome the aforementioned problems.

To this end, the object of the invention is related to a device and a rail vehicle according to the claims.

BRIEF DESCRIPTION OF THE DRAWINGS

The invention will be better understood upon reading of the description that will follow, given only by way of an example and by making reference to the figures annexed among which.

DETAILED DESCRIPTION OF THE PREFERRED EMBODIMENTS

Figure 1:
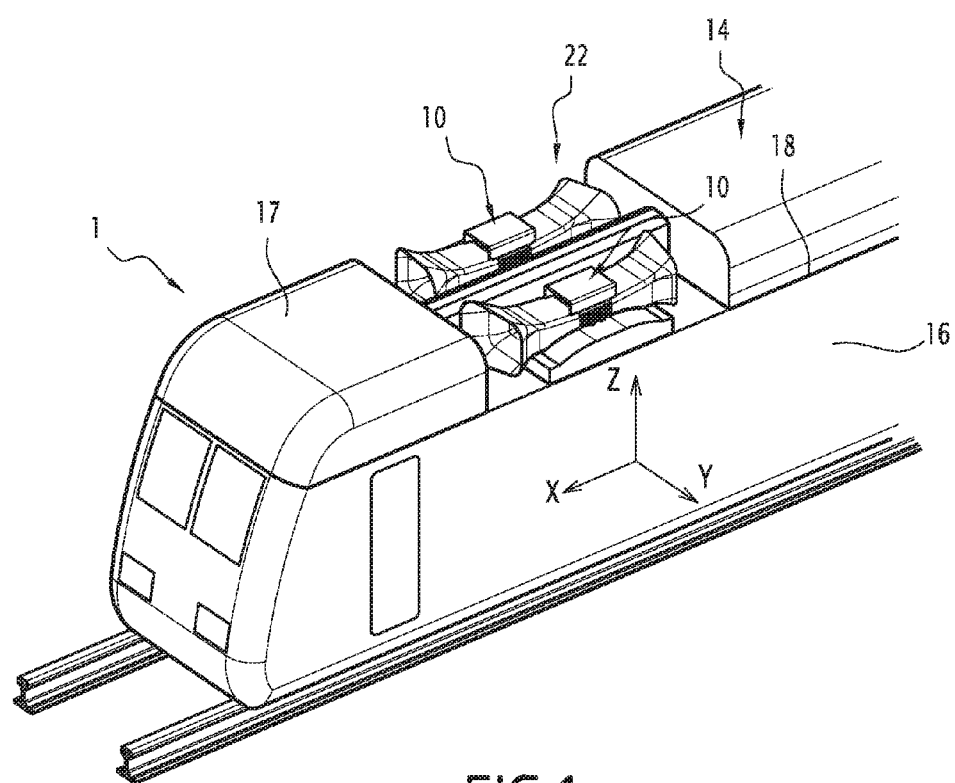
FIG. 1 is a perspective view of a railway vehicle comprising an aeraulics device according to an example of embodiment of the invention.

FIG. 1 is a general representation of a railway vehicle 1.

In this present description, an XYZ coordinate system is associated with the vehicle 1, with the X axis, the longitudinal axis of the vehicle 1, oriented from the rear towards the front along the direction of travel of the vehicle 1; the y axis, the transversal axis of the railway vehicle oriented from right to left; and the z axis, the vertical axis of the vehicle 1, oriented from bottom to top.

The vehicle 1 includes at least one car 14, whose body comprises of lateral walls 16 and a roof 18.

The roof 18 bears a cowling enclosure 17 for stowing the equipment and tools of the vehicle placed on the roof.

In particular, the cowling 17 delimits a housing 22, opened from above, for receiving two cooling aeraulics device 10.

Each device 10 is disposed, on the roof 18 of the vehicle 1, between two transverse walls at the front and the rear of the cowling 17. The devices 10 are disposed symmetrically in relation to a median plane X-Z of the car 14.

A cooling aeraulics device 10 is intended to cool the condenser 12 part of a cooling device 13 (FIG. 3) of an assembly of bipolar transistors with insulated gate (known by the English acronym "IGBT" for "Insulated Gate Bipolar Transistor") for ensuring the supply of power to the traction motors of the vehicle.

The condenser 12 is formed by a plurality of tubes 14 for circulation of a heat transfer fluid housed within the interior of the device 10 as will be described here below.

Figure 2:
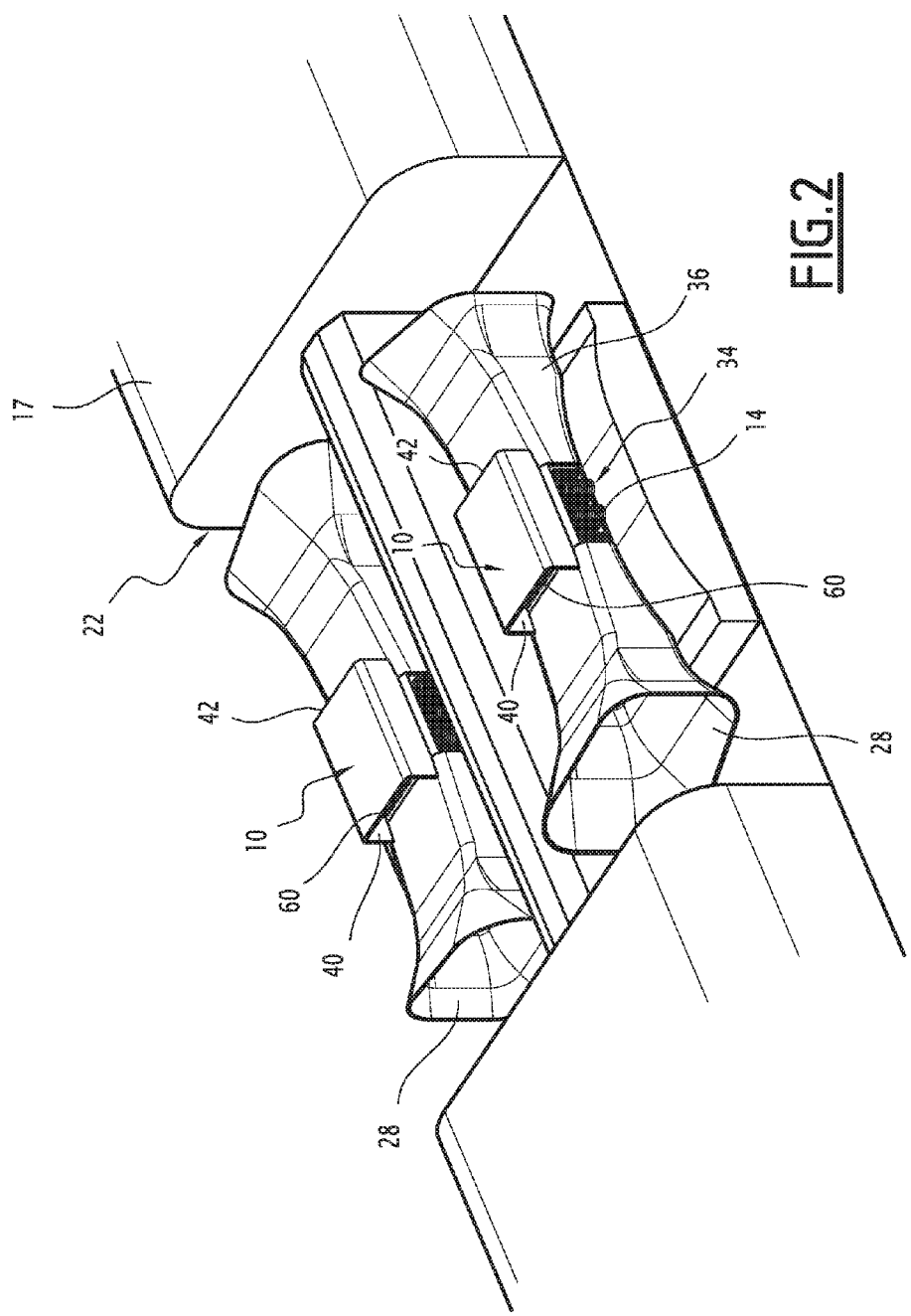
FIG. 2 is a perspective view of a cooling aeraulics device fitted to the vehicle shown in FIG. 1, represented partially, and of which some walls are represented in transparency; and, FIG. 3 is a cross sectional view, represented partially, along a plane that is longitudinal to the vehicle, of the cooling device shown in FIG. 2.
Figure 3:
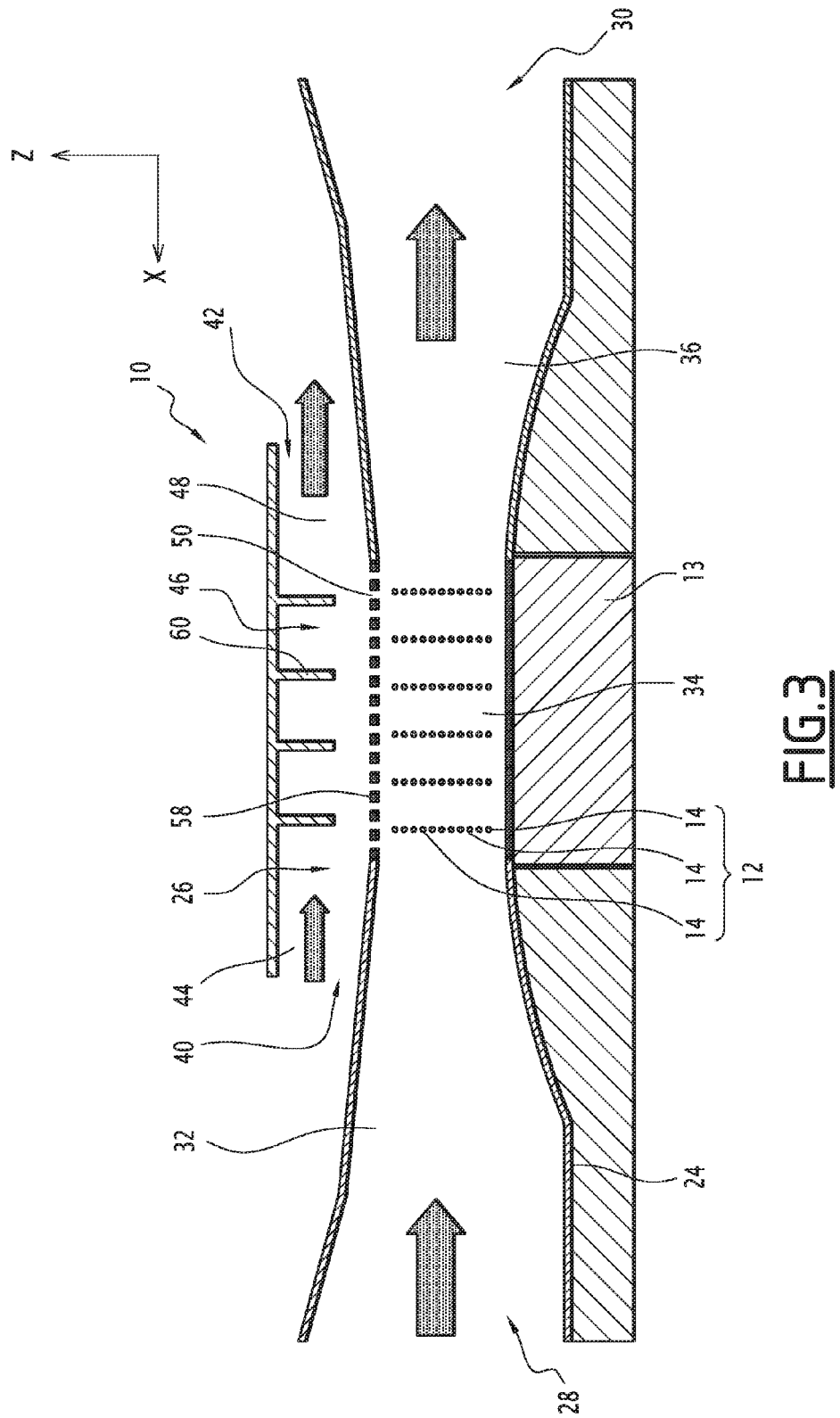

As it has been represented in cross section according to a plane parallel to the X-Z plane on the FIGS. 2 and 3, the device 10 includes a main conduit 24 and a secondary conduit 26, an air circulation passage 50 for circulation of air being formed between the main conduit 24 and the secondary conduit 26.

The main conduit 24 extends substantially longitudinally.

Between a front opening 28 and a rear opening 30, the main conduit 24 comprises successively, from the front to the rear, a front portion 32, a central portion 34 and a rear portion 36.

The central portion 34 is the portion inside of which are housed the tubes 14 of the condenser 12 to be cooled. They are mounted in a manner so as to be positioned parallel to the transverse direction Y.

The front portion 32 constitutes a front scoop for intake of fresh air in the main conduit 24.

The front portion 32 is flared in a manner such that the front opening 28 extends out, in projection in a transverse plane Y-Z, closest to the static vehicle envelope of the vehicle 1, in a manner such as to capture the streams of air flowing along the cowling 17, both on the top as well as on the sides of the latter.

The rear portion 36 constitutes a rear scoop for discharge of hot air from the main conduit 24.

The rear portion is flared in a manner such that the rear opening 30 extends out, in projection in a transverse plane Y-Z, closest to the static vehicle envelope of the vehicle 1, in such manner as to suppress the air flowing in the main conduit 24 above and on the sides of the cowling 17.

The walls of the main conduit 24 present, along the X-Z plane, a profile such that the transverse cross-section of the conduit decreases from the front opening 28 towards the central portion 34 and then increases from the central portion 34 towards the rear opening 30.

More precisely, the longitudinal evolution of the transverse cross-section of the main conduit 24 varies in a manner so as to generate an acceleration of the flow of air by means of the Venturi effect in the central portion 34.

The front portion 32 thus presents a transverse cross section whose surface decreases from the front towards the rear. The variation in the surface of the transverse cross section is continuous from the front opening 28 up to the entry of the central portion 34.

The ratio between the surface of the transverse cross section of the front portion 32 at the level of the front opening 28 and the surface of the transverse cross section of the front portion 32 at the level of its junction with the central portion 34 is greater than 2, advantageously comprised between 2 and 3.

The rear portion 36 thus presents a transverse cross section whose surface increases from the front towards the rear. The variation in the surface of the transverse cross section is continuous from the junction with the central portion 34 until the rear opening 30.

The ratio between the surface of the transverse cross section of the rear portion 36 at the level of the rear opening 30 and the surface of the transverse cross section of the rear portion 36 at the level of its junction with the central portion 34 is greater than 2, advantageously comprised between 2 and 3.

By means of the appropriate geometry of the main conduit 24, the air is accelerated in a manner so as to circulate with a suitable speed around the tubes 14 to be cooled. This acceleration makes it possible to compensate for a low speed of intake in the front portion 32 of the main conduit 24, a speed which would be insufficient to cool the element to be cooled.

Thus, even for a low travelling speed of the railway vehicle, the rate of air flow circulating in the central portion is high enough in order to allow for discharge of the quantity of heat necessary to ensure the efficient operation of the cooling device.

Preferably, in order to further improve the performance of the main conduit 24, the device 10 includes a secondary conduit 26, which extends substantially parallel to and above the main conduit 24, in the longitudinal direction of the railway vehicle.

Between a front orifice 40 and a rear orifice 42, the secondary conduit 26 comprises successively, from the front towards the rear, a front part 44, a central part 46 and a rear part 48.

The central part 46 is located above the central portion 34 of the main conduit 24.

The front orifice 40 allows for the intake of fresh air from the exterior into the secondary conduit 26. The front part 44 forms a scoop that makes it possible to capture the air and bring it towards the central part 46.

The rear orifice 42 allows for ejection of hot air towards the exterior from the secondary conduit 26. The rear part 48 forms a scoop that makes possible the ejection of air from the central part 46.

The lateral walls, top wall and bottom wall of the central part 46 define a chamber.

The bottom wall of the central part 46 is equipped with a passage 50 that makes possible the fluid communication between the central portion 34 and the central part 46. A 58 grid is placed across the passage 50.

The transverse cross section of the secondary conduit 26 is substantially constant from the front to the rear.

The central part 46 of the secondary conduit is equipped with deflectors 60 that serve to generate turbulence in the air flow circulating in the secondary conduit 26.

The deflectors 60 are borne on the upper wall of the central part 46. The deflectors 60 protrude out from the upper wall towards the grid 58.

The deflectors 60 take the form of a rod, a plane or any other suitable form that is capable of causing turbulence in the flow of air captured by the front part 44.

Thus the central part 46 is designed to generate turbulence in the flow of air circulating into the secondary conduit. These turbulences are capable of generating a depression at the level of the passage 50, and, therefore, in the central portion 34 of the main conduit 24.

Preferably the depression created by the turbulence compensates for the loss of load in the main conduit caused by the tubes 14 to be cooled.

The passage 50 between the main and secondary conduits allows for a fraction of the flow of air taken into the main conduit, to pass in the secondary conduit and to be ejected through the rear orifice of the secondary conduit.

The increase in the depression in the central portion 34 of the main conduit 24 accelerates to a greater extent the air captured by the front portion 28.

The secondary conduit 26 thus makes it possible to improve the aeraulics of the main conduit 24.

The cooling aeraulic device 10 ensures optimal cooling, without recourse to a fan or to any other mechanical moving or rotary parts.

The cooling aeraulics device advantageously exploits the Venturi effect in order to cool a condenser.

What is claimed is:

1. An aeraulic device for cooling an element of a rail vehicle, the aeraulic device being configured to be placed on a roof of said rail vehicle such that said conduit extends longitudinally in relation to said rail vehicle, said aeraulic device comprising
   a main conduit; and
   a secondary conduit which extends parallel to the main conduit,
   said main conduit comprising successively a front portion, equipped with a front opening for air intake, a central portion, in which is housed said element to be cooled, and a rear portion, equipped with a rear opening for air discharge,
   wherein a surface of a transverse cross-section of the main conduit evolves, from the front opening to the rear opening, so as to generate an acceleration of the flow of air in the conduit by means of a Venturi effect, wherein the secondary conduit comprises a front part, equipped with a front orifice for air intake, a central part, and a rear part, equipped with a rear orifice for air discharge, and wherein a surface of a transverse cross section of the secondary conduit evolves from the front orifice to the rear orifice of the secondary conduit so as to generate turbulences promoting the acceleration of the flow of air in the main conduit.

2. The aeraulic device according to claim 1, in which the surface of the transverse cross section of the central portion of the said main conduit is lower than the surface of the transverse cross section of the front portion of the said main conduit.

3. The aeraulic device according to claim 2, in which the surface of the transverse cross section of the central portion of the said main conduit is lower than the surface of the transverse cross section of the rear portion of the said main conduit.

4. The aeraulic device according to claim 1, in which the front and rear openings of the said main conduit are arranged transversely to a longitudinal axis of the railway vehicle.

5. The aeraulic device according to claim 1, in which the secondary conduit and the main conduit are connected to one another by a passage that permits circulation of air, the passage extending between the central portion of said main conduit and the central part of said secondary conduit, the disturbances promoting the acceleration of the flow of air in the central portion of the main conduit.

6. The aeraulic device according to claim 1, in which the central part of the secondary conduit is equipped with at least one deflector generating turbulences in the flow of air circulating into the secondary conduit.

7. The aeraulic device according to claim 6, in which the deflector is borne by a top surface of the central part of the secondary conduit and protrudes out in the central part of the secondary conduit.

8. The aeraulic device according to claim 7, in which the deflector is a rod or a plate.

9. A rail vehicle comprising an element to be cooled, wherein said rail vehicle has a aeraulic device according to claim 1, for cooling said element to be cooled, the aeraulic device being fixed on a roof of the rail vehicle such that one axis of the main conduit extends parallel to a longitudinal axis of the rail vehicle.

* * * * *